US012574767B2

(12) United States Patent
Henri et al.

(10) Patent No.:    US 12,574,767 B2
(45) Date of Patent:    Mar. 10, 2026

(54) AUTOMATIC LABELLING OF DATA FOR MACHINE LEARNING ALGORITHM TO DETERMINE CONNECTION QUALITY

(71) Applicant: Cisco Technology, Inc., San Jose, CA (US)

(72) Inventors: Sebastien Christophe Henri, San Francisco, CA (US); Apurv Bhartia, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 761 days.

(21) Appl. No.: 16/881,421

(22) Filed: May 22, 2020

(65) Prior Publication Data

US 2021/0204151 A1    Jul. 1, 2021

Related U.S. Application Data

(60) Provisional application No. 62/954,107, filed on Dec. 27, 2019.

(51) Int. Cl.
| | |
|---|---|
| *H04W 24/08* | (2009.01) |
| *G06F 18/214* | (2023.01) |
| *G06N 20/00* | (2019.01) |
| *H04L 43/08* | (2022.01) |
| *H04L 43/12* | (2022.01) |

(52) U.S. Cl.
CPC .......... *H04W 24/08* (2013.01); *G06F 18/214* (2023.01); *G06N 20/00* (2019.01); *H04L 43/08* (2013.01); *H04L 43/12* (2013.01)

(58) Field of Classification Search
None
See application file for complete search history.

(56) References Cited

U.S. PATENT DOCUMENTS

| | | | | |
|---|---|---|---|---|
| 9,350,616 | B1* | 5/2016 | Lou ...................... | H04L 43/0852 |
| 9,503,384 | B1* | 11/2016 | Oliveira .............. | H04L 43/0882 |
| 10,194,268 | B1* | 1/2019 | Chu ...................... | H04W 4/023 |
| 10,313,244 | B2* | 6/2019 | Tang ...................... | H04L 47/12 |
| 10,616,314 | B1* | 4/2020 | Plenderleith ........ | H04L 67/1027 |
| 2011/0128864 | A1* | 6/2011 | Chan ...................... | H04L 43/12 |
| | | | | 370/252 |
| 2013/0107729 | A1* | 5/2013 | Wagner ............... | H04L 43/0882 |
| | | | | 370/252 |
| 2014/0105019 | A1* | 4/2014 | Harrang .............. | H04L 43/0888 |
| | | | | 370/235 |

(Continued)

*Primary Examiner* — Chirag G Shah
*Assistant Examiner* — Suk Jin Kang
(74) *Attorney, Agent, or Firm* — Polsinelli P.C.

(57)    ABSTRACT

A method includes sending at least one probe to a mobile device to determine a burst size of at least one burst; sending the at least one burst to the mobile device, the at least one burst includes a first and a second number of probes, the first number of probes are sent to the mobile device at a first time and the second number of probes are sent to the mobile device at a second time after the first time, and the first number of probes and the second number of probes are based on the burst size; receiving an acknowledgement of receipt of the first number of probes at a third time; receiving an acknowledgement of receipt of the second number of probes at a fourth time; and determining, based on a difference between the third time and the fourth time, a throughput of the mobile device.

14 Claims, 7 Drawing Sheets

400

Send at least one burst with at least a first number of probes and a second number of probes to the mobile device
402

Receive acknowledgement of receipt of each of the first number of probes and the second number of probes
404

Determine a throughput based on the difference between the third and fourth time
406

Repeat throughput determination?    Yes
408

No

Label data/ metric of the endpoint device with corresponding throughput
410

(56)  References Cited

U.S. PATENT DOCUMENTS

| | | | |
|---|---|---|---|
| 2014/0119215 A1* | 5/2014 | Rojas-Cessa | H04L 43/10 |
| | | | 370/252 |
| 2015/0195205 A1* | 7/2015 | Flinta | H04L 43/0882 |
| | | | 370/230.1 |
| 2016/0337222 A1* | 11/2016 | Stokking | H04L 43/0888 |
| 2017/0135009 A1* | 5/2017 | Ling | H04L 43/10 |
| 2017/0318426 A1* | 11/2017 | Bhavsar | G01S 5/0205 |
| 2018/0317131 A1* | 11/2018 | Striegel | H04L 43/0882 |
| 2019/0028909 A1* | 1/2019 | Mermoud | H04W 16/18 |
| 2019/0140932 A1* | 5/2019 | Besehanic | H04L 47/823 |
| 2019/0150150 A1* | 5/2019 | Calin | H04W 72/0453 |
| | | | 370/329 |
| 2019/0182773 A1* | 6/2019 | Su | H04W 52/0206 |
| 2019/0200244 A1* | 6/2019 | Polepalli | G06N 20/00 |
| 2019/0327626 A1* | 10/2019 | Zhang | H04L 5/0048 |
| 2019/0342781 A1* | 11/2019 | Bhagavatula | H04W 24/08 |
| 2019/0364573 A1* | 11/2019 | Fu | H04W 72/0413 |
| 2020/0322216 A1* | 10/2020 | Singla | H04L 41/12 |
| 2020/0389381 A1* | 12/2020 | Oshiba | H04L 43/0894 |
| 2021/0007159 A1* | 1/2021 | Jain | H04W 8/005 |
| 2021/0143951 A1* | 5/2021 | Chu | H04L 1/1621 |
| 2021/0168088 A1* | 6/2021 | Momchilov | H04L 69/166 |
| 2021/0243610 A1* | 8/2021 | Das | H04L 41/145 |
| 2021/0320857 A1* | 10/2021 | Kish | H04L 43/16 |
| 2022/0053352 A1* | 2/2022 | Bhagavatula | H04M 11/062 |
| 2022/0200858 A1* | 6/2022 | Yan | H04L 47/10 |
| 2022/0295324 A1* | 9/2022 | Pantelidou | H04W 24/08 |
| 2022/0400394 A1* | 12/2022 | Eleftheriadis | H04W 24/04 |

* cited by examiner

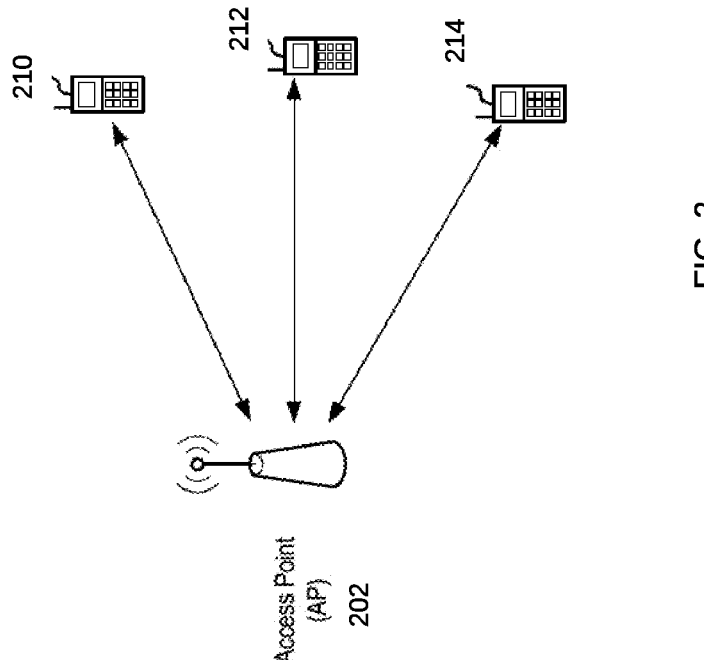
FIG. 2

300

Send at least one probe to an endpoint device
302

Receive response from the endpoint device
304

Determine a burst size for active monitoring the endpoint device
306

400

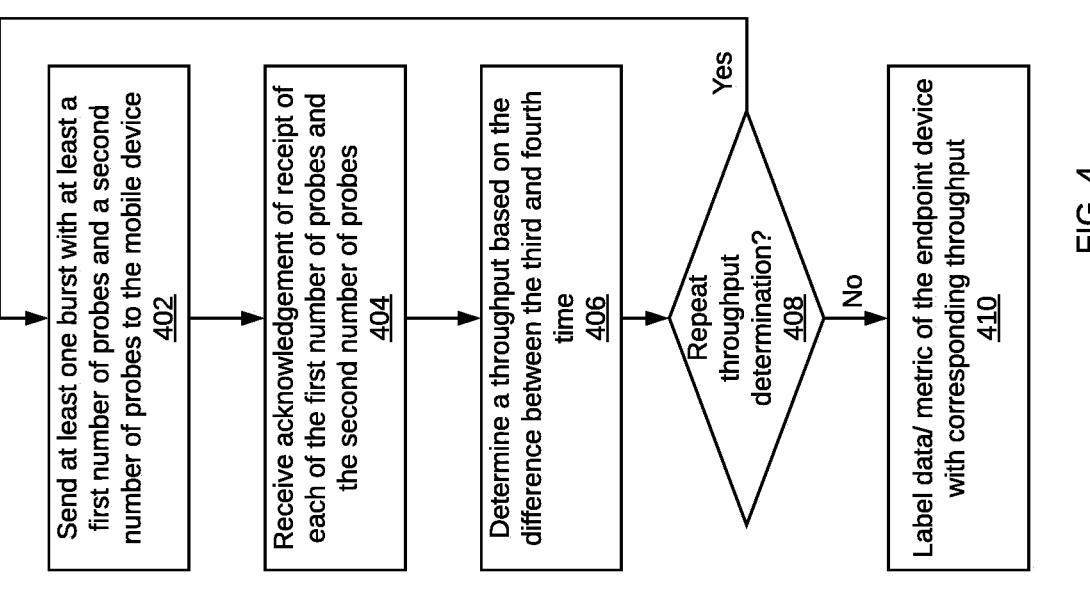

Send at least one burst with at least a first number of probes and a second number of probes to the mobile device
402

↓

Receive acknowledgement of receipt of each of the first number of probes and the second number of probes
404

↓

Determine a throughput based on the difference between the third and fourth time
406

↓

Repeat throughput determination?
408

Yes →

No ↓

Label data/ metric of the endpoint device with corresponding throughput
410

FIG. 4

AUTOMATIC LABELLING OF DATA FOR MACHINE LEARNING ALGORITHM TO DETERMINE CONNECTION QUALITY

CROSS-REFERENCE TO RELATED APPLICATIONS

This application claims priority to U.S. Provisional Patent Application No. 62/954,107, filed on Dec. 27, 2019, entitled "LABELLING OF WIRELESS NETWORKS STATISTICS THROUGH ACTIVE BANDWIDTH ESTIMATION TO DETERMINE CONNECTION QUALITY," the content of each of which is incorporated herein by reference in its entirety.

TECHNICAL FIELD

The present technology pertains to automatically labelling data for training machine learning algorithms to determine the health of wireless clients. More specifically, the present application pertains to active probing of a client device to determine a throughput, and labeling data associated with the client device with the determined throughput to be used for training machine learning algorithms.

BACKGROUND

Machine learning (ML) techniques are increasingly being used to evaluate the health of wireless clients and networks, either directly by wireless vendors or by third-parties that install specific devices in a network. ML techniques require a large amount of labelled data for training the ML, which once trained can be used to evaluate the health of such clients and networks. The labels (based on health scores) indicate whether a client connection is healthy or unhealthy under given link conditions. For ML techniques to be efficient, a large amount of labelled data is required. However, continuous and/or intermittent manual labelling of large-scale data is inefficient and infeasible. Furthermore, automatically labelling data is difficult because it is difficult to automatically determine if a client is healthy or not in a given situation.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 2 illustrates an example wireless communication network, according to one aspect of the present disclosure;

FIG. 4 illustrates an example method for determining the throughput of endpoint devices by active monitoring, according to an aspect of the present disclosure;

DESCRIPTION OF EXAMPLE EMBODIMENTS

Figure 1A:
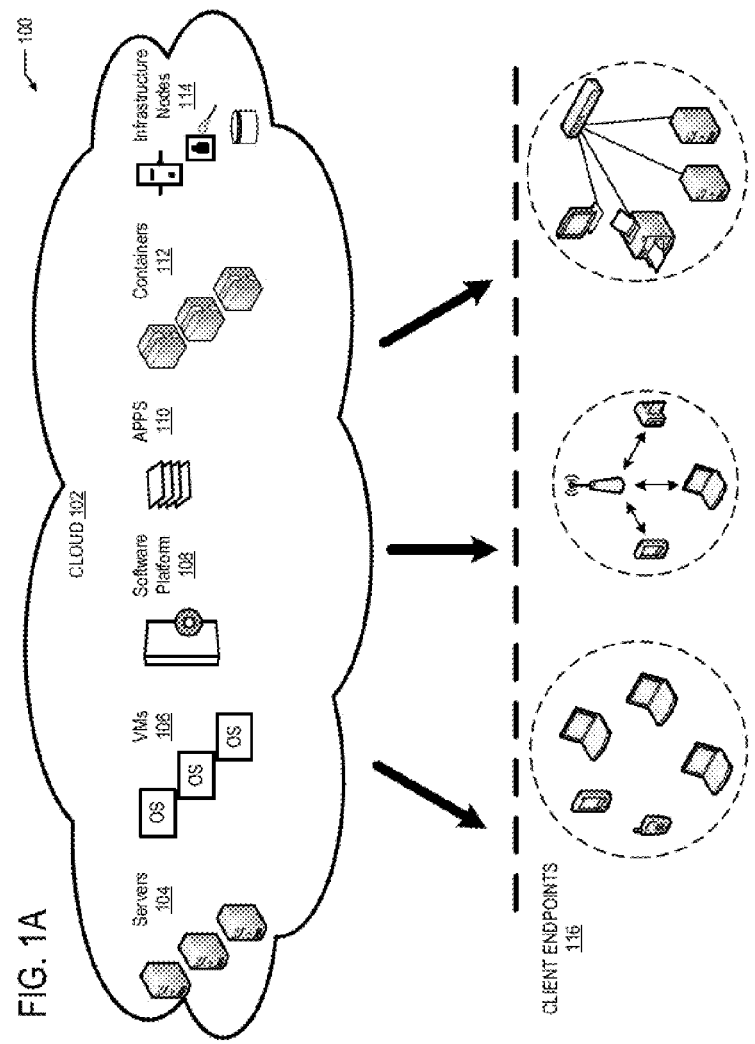
FIG. 1A illustrates an example cloud computing architecture, according to one aspect of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control. Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

The present disclosure provides systems and methods for automatic labeling of training data to be used for training machine learning algorithms that can be used to determine the health of wireless clients. As will be described below, active monitoring and probing of connections between wireless clients and access points is used to determine real throughput of each wireless client. The real throughput and set of data (metrics) associated with the corresponding wireless client can be used to identify the health of the wireless client. The throughput is used for labeling the set of data (e.g., metrics) associated with each wireless device, which is used for training the machine learning algorithm. As will be described, the active probing does not add significant overhead on the network and hence does not negatively affect a given endpoint device's user experience.

In one aspect, a method includes sending, by an access point, at least one probe to a mobile device to determine a burst size of at least one burst; sending, by the access point, the at least one burst to the mobile device, wherein the at least one burst includes a first number of probes and a second number of probes, wherein the first number of probes are sent to the mobile device at a first time and the second number of probes are sent to the mobile device at a second time after the first time, and wherein the first number of probes and the second number of probes are based on the burst size; receiving, from the mobile device, an acknowledgement of receipt of the first number of probes at a third time; receiving, from the mobile device, an acknowledgement of receipt of the second number of probes at a fourth time; and determining, based on a difference between the third time and the fourth time, a throughput of the mobile device.

In another aspect, the method further includes labeling a set of data of the mobile device with the determined throughput; and training a machine learning algorithm using the labeled set of data for predicting a wireless connection quality of the mobile device.

In another aspect, the set of data comprises at least one of a signal strength, an interference level, a latency, a physical data-rate, or a packet loss rate.

In another aspect, the first number of probes are aggregated into a first aggregated frame, and wherein the second number of probes are aggregated into a second aggregated frame.

In another aspect, the at least one probe comprises at least one data packet, and wherein each of the first number of probes and the second number of probes comprises at least one data packet.

In another aspect, the at least one probe is sent to the mobile device at a current data rate of the mobile device.

In another aspect, detecting at least one change in a network condition of the mobile device triggers the determining step.

In one aspect, an access point includes one or more processors and at least one computer-readable storage medium storing instructions which, when executed by the one or more processors, cause the one or more processors to send, by an access point, at least one probe to a mobile device to determine a burst size of at least one burst; send, by the access point, the at least one burst to the mobile device, wherein the at least one burst includes a first number of probes and a second number of probes, wherein the first number of probes are sent to the mobile device at a first time and the second number of probes are sent to the mobile device at a second time after the first time, and wherein the first number of probes and the second number of probes are based on the burst size; receive, from the mobile device, an acknowledgement of receipt of the first number of probes at a third time; receive, from the mobile device, an acknowledgement of receipt of the second number of probes at a fourth time; determine, based on a difference between the third time and the fourth time, a throughput of the mobile device.

In one aspect, a non-transitory computer-readable storage medium includes computer-readable instructions which, when executed by one or more processors of an access point, cause the access point to send, by an access point, at least one probe to a mobile device to determine a burst size of at least one burst; send, by the access point, the at least one burst to the mobile device, wherein the at least one burst includes a first number of probes and a second number of probes, wherein the first number of probes are sent to the mobile device at a first time and the second number of probes are sent to the mobile device at a second time after the first time, and wherein the first number of probes and the second number of probes are based on the burst size; receive, from the mobile device, an acknowledgement of receipt of the first number of probes at a third time; receive, from the mobile device, an acknowledgement of receipt of the second number of probes at a fourth time; determine, based on a difference between the third time and the fourth time, a throughput of the mobile device.

DESCRIPTION

The disclosed technology improves machine learning (ML) techniques currently utilized to determine and evaluate the health of wireless endpoints in a network such as an enterprise network. One example improvement provided here is the automatic labeling of data used for training the algorithm, which currently is a manual process.

As mentioned above, ML has been utilized to determine the health of endpoint devices operating in a given network such as an enterprise network. Such algorithms can predict in a given situation if the endpoint is healthy (operating in a normal state) or unhealthy (operating in an abnormal state). In order to make such a prediction, a ML algorithm must be trained on a large amount of data that represents the current network conditions for a particular endpoint. Such data include but are not limited to signal strength, device type, current data usage, etc. Furthermore, effective ML algorithms require such data to be labeled (indicate in all these situations, if the state of an endpoint device is healthy or unhealthy). These states may be determined based on a health score, which are typically determined passively based on metrics such as Received Signal Strength Indicator (RSSI), physical data-rate, packet loss rate, etc., or a combination of one or more such metrics. However, passive monitoring-based metrics are indirectly and loosely related to the quality of experience of a corresponding endpoint device and thus to the healthy/unhealthy state of the corresponding endpoint device, because wireless conditions exhibit significant temporal and spatial variations which are often difficult to capture by these passive measurements. Moreover, other factors like device type (e.g., underlying hardware and/or software) also play an important role in the network performance of the endpoint device and further diminish the applicability of passive-monitoring in ML solutions.

The present application intends to address the above deficiencies by providing a mechanism to automatically label data used for training these ML algorithms. As opposed to the passive monitoring described above, the present disclosure provides an active probing scheme that more accurately captures the temporal and spatial variations in wireless conditions. Such active probing provides a more accurate/real achievable throughput of an underlying endpoint device that can represent a health score and state of the endpoint. The health score is then used to label corresponding data of the endpoint. This labeling is performed automatically without adding significant overhead to the network because it does not require sending a fixed number of packets from an access point to an endpoint device that would be agnostic to a particular endpoint device's and Wi-Fi capabilities (sending too few packets can make the estimation imprecise, and sending too many packets can incur significant overhead on the network and thus impact the endpoint qualify of experience). The labeled data can then be used as input for training the ML algorithms that are subsequently deployed to predict endpoint devices and network health.

Figure 3:
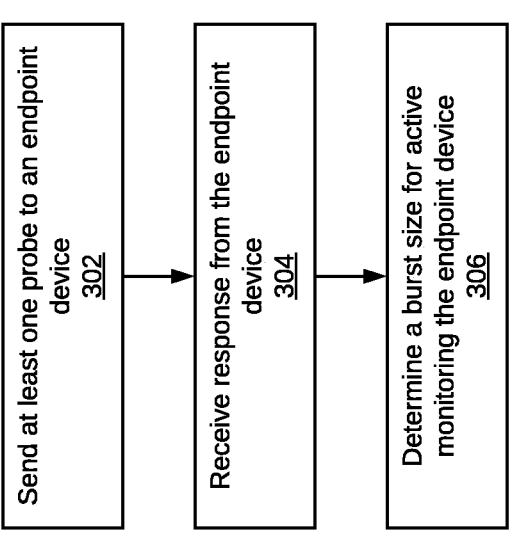
FIG. 3 illustrates an example method for determining the bust size for active monitoring according to an embodiment of the present disclosure, according to one aspect of the present disclosure.
Figure 5:
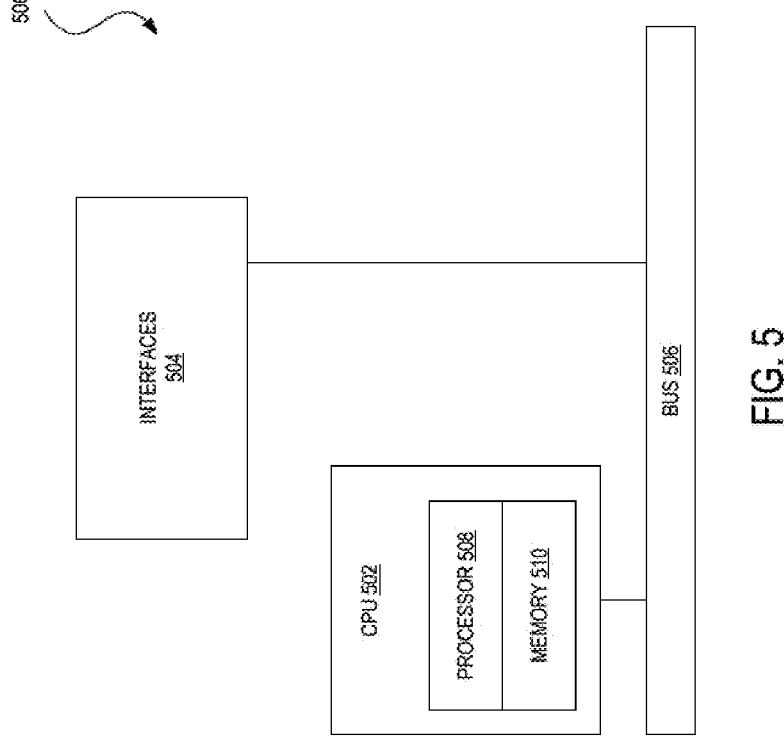
FIG. 5 illustrates an example networking device, according to one aspect of the present disclosure.
Figure 6:
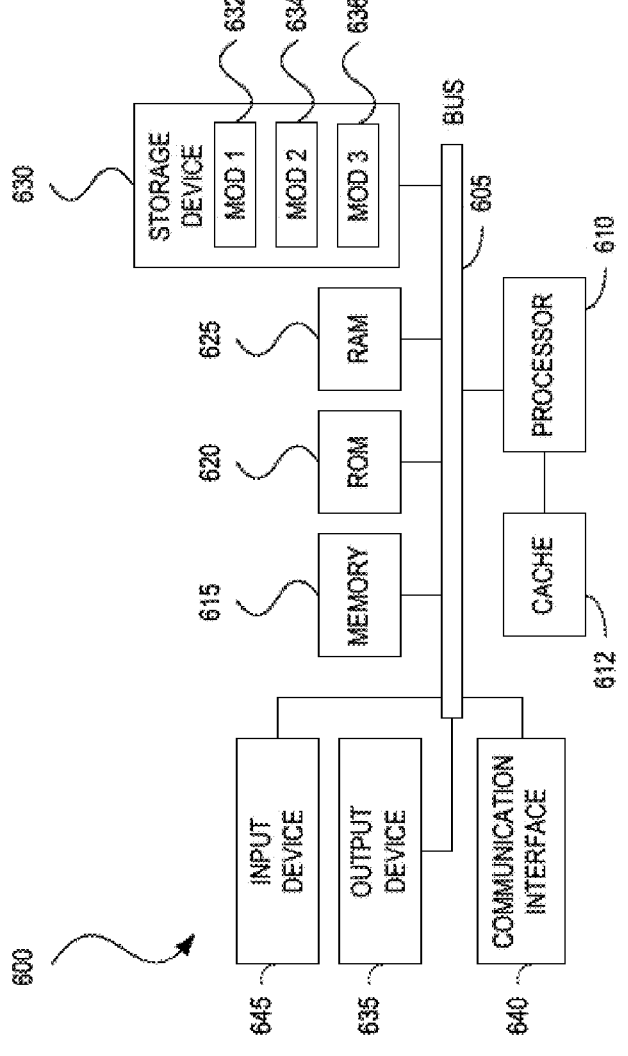
FIG. 6 illustrates an example computing system, according to one aspect of the present disclosure.

The disclosure begins with a description of network environments and architectures for network data access and services, as illustrated in FIGS. 1-2. A discussion of systems, methods, and computer readable media for determining the throughput of endpoint devices by active monitoring, as shown in FIG. 3, will then follow. The discussion then concludes with a brief description of example devices and system architectures that can be used for implementing the concepts of present disclosure, as illustrated in FIGS. 5 and 6.

FIG. 1A illustrates an example cloud computing architecture, according to an aspect of the present disclosure. Cloud computing architecture 100 can include a cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

The client endpoints 116 can communicate with the elements 104-114 as part of accessing network services through infrastructure intermediation messaging. Specifically, communications between the elements 104-114 and the endpoints 116 can be managed and otherwise controlled through a network infrastructure between the client endpoints 116 and the cloud 102. For example, either or both an LTE infrastructure and a WiFi infrastructure can communicate a physical location of a client endpoint to a cloud service. In turn, the cloud service can cause the infrastructure to send specific signaling to the client endpoint for accessing network services through the cloud service. For example, the cloud service can use the LTE infrastructure, e.g. through an LTE S14 interface, to alert the client endpoint of WiFi availability through the WiFi infrastructure. In another example, the cloud service can use the WiFi infrastructure, e.g. through MBO WiFi messaging, to alert the client endpoint of LTE availability through the LTE infrastructure.

Figure 1B:
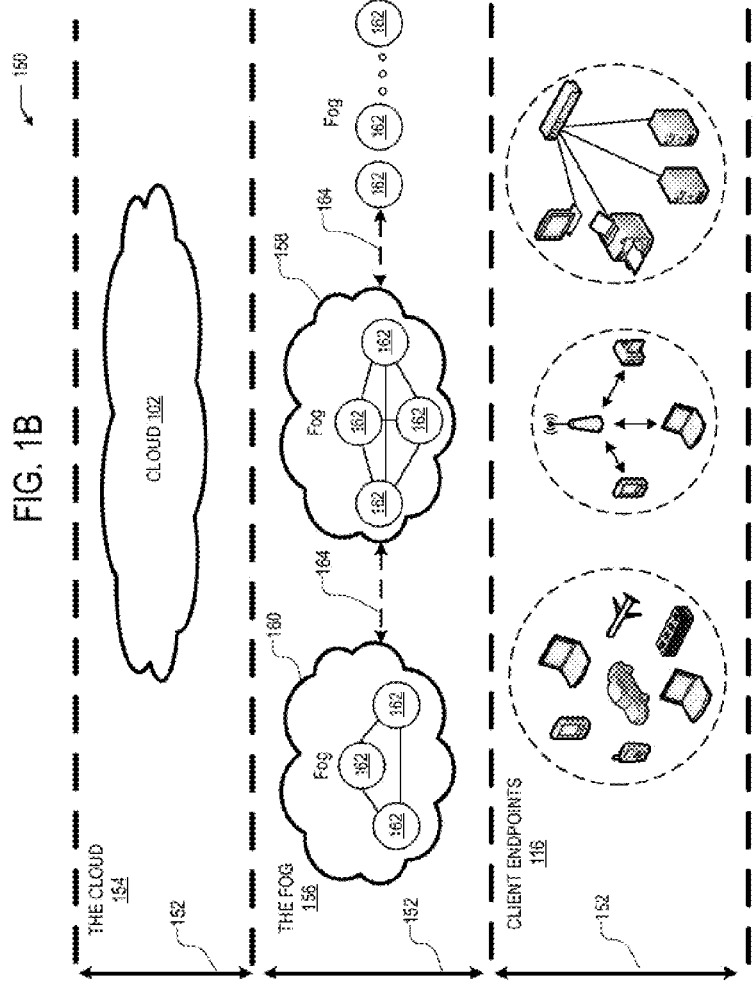
FIG. 1B illustrates an example fog computing architecture, according to one aspect of the present disclosure.

FIG. 1B illustrates a diagram of an example fog computing architecture, according to one aspect of the present disclosure. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 160 can be local or regional clouds or networks. For example, the fog instances 158, 160 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

FIG. 2 illustrates an example wireless communication network, according to one aspect of the present disclosure. The wireless communication network 200 can form an enterprise wireless network. In turn, the systems and techniques described herein can be utilized in controlling link selection and aggregation across the wireless communication network 200 and another network.

The wireless communication network 200 includes an Access Point (AP) 202, configured for wireless communication with multiple receivers or endpoint devices (e.g., 210, 212, and 214), which may also be referred to as mobile devices. End point devices 210, 212 and 214 may be the same as mobile devices, laptops, etc., of client endpoints 116. It is understood that additional (or fewer) endpoint devices and/or APs could be implemented in network 200, without departing from the scope of the technology. The endpoint devices and AP 202 shown in FIG. 2 can be configured to form a Wi-Fi network. AP 202 may be the same as access point configured as one of client endpoints 116 or devices 162 of fog 156 that are functioning as an access point. A Wi-Fi network, as used herein, is a network that is formed in maintained in accordance with the Institute of Electrical and Electronics Engineers (IEEE) 802.11 family of standards. Specifically, the AP 202 and the endpoint devices can wirelessly communicate with each other according to the IEEE 802.11 family of standards to form a Wi-Fi network.

The AP 202 may have access or interface to a Distribution System (DS) or another type of wired/wireless network that may carry traffic in and out of a basic service set (BSS) (not illustrated). Thus traffic to endpoint devices can originate from outside the BSS, and arrive through the AP 202 for delivery to the endpoint devices. Conversely, traffic originating from endpoint devices to destinations outside the BSS can be sent to the AP to be delivered to the respective destinations. Traffic between endpoint devices within the BSS can be sent through the AP 202 where the source client device may send traffic to the AP 202 and the AP 202 may deliver the traffic to the destination client device. The traffic between endpoint devices within a BSS may be peer-to-peer traffic.

Using the IEEE 802.11 infrastructure mode of operation, the AP 202 can transmit on a fixed channel, for example that is 20 MHz wide, and designated as the operating channel of the BSS. This channel may also be used by the endpoint devices to establish a connection with the AP 202. The channel access in an IEEE 802.11 system may be Carrier Sense Multiple Access with Collision Avoidance (CSMA/CA). In this mode of operation, the endpoint devices, including the AP, can sense the primary channel. If the channel is detected to be busy, the client device may back off. If the channel is detected to be free, the client device may acquire the channel and transmit data. Alternatively, the AP 202 can implement an applicable form of direct scheduling, e.g. Orthogonal Frequency Division Multiple Access (OFDMA) scheduling, to control contention and collision avoidance between the endpoint devices.

It is understood that network 200 can implement various wireless standards using different channel sizes (bandwidths), without departing from the technology. By way of example, IEEE 802.11n, High Throughput (HT) endpoint devices may be used, e.g., implementing a 40 MHz communication channel. This can be achieved, for example, by combining a primary 20 MHz channel, with an adjacent 20 MHz channel to form a 40 MHz wide contiguous channel. In IEEE 802.11a/c, very high throughput (VHT) endpoint devices can also be supported, e.g., 20 MHz, 40 MHz, 80 MHz, and/or 160 MHz wide channels. The 40 MHz, and 80 MHz, channels can be formed, e.g., by combining contiguous 20 MHz channels. A 160 MHz channel may be formed, for example, by combining eight contiguous 20 MHz channels, or by combining two non-contiguous 80 MHz channels (e.g., referred to as an 80+80 configuration).

With FIGS. 1 and 2 described, the disclosure now turns to description of example systems and methods for automatic data labeling using active probing to be used for training ML algorithms and techniques utilized in predicting/determining health of endpoint devices and networks in which they operate.

FIG. 3 illustrates an example method for determining the burst size for active monitoring, according to an aspect of the present disclosure. The process 300 of FIG. 3 will be described from perspective of access point 202 of FIG. 2 but it should be understood that access point 202 has one or more processors configured to execute computer-readable instructions stored on one or more memories of access point 202 to implement the steps of FIG. 3.

At S302, access point 202 sends at least one probe to an endpoint device (e.g., a mobile device which can be any one of endpoint devices 210, 212 and 214) to determine a burst size of at least one burst. In one example, a burst size can be defined as the number of probes required to send at least two aggregated frames (e.g. A-MPDU or PLCP Protocol Data Unit (PPDU)). A probe may be defined as a data packet (e.g. MAC-level protocol data unit (MSDU)). Such data packet can be sent as part of an aggregated frame. In one example, a number of initial probes (at least one) is sent at a current data rate of the mobile device to determine a burst size and a number of require probes.

The initial probe(s) may be referred to as sounding probe(s) and thus process 300 may be referred to as the sounding phase for estimating the throughput of the mobile device to which the sounding probe(s) are sent. In the sounding phase, at least one probe is sent in at least one PPDU. Each PPDU is sent at a given physical rate (which can be determined by access point 202 based on current network conditions, in particular, signal strength to the mobile device). The sounding phase is used to determine the current physical rate to a corresponding endpoint device, which depends on the corresponding endpoint device's capabilities, the network configurations and environmental conditions. This physical rate will determine the number of probes in the estimation phase described below.

In one example, the number of the sounding probe(s) and the number of data packets included within each one of the sounding probe(s) can be predetermined constant numbers as capabilities of a target endpoint device is unknown to access point 202 at this point and further for ensuring that sending the sounding probe(s) does not adversely impact the network connection of the mobile/endpoint device. In one example, the number of the sounding probe(s) and the number of data packets included within each one of the at least one probe being sent to different mobile devices are the same. In another example, at least one data packet is sent within each sounding probe without the probes being aggregated into a frame.

At S304, access point 202 receives response from each endpoint device to which sounding probe(s) are sent at S302. For example, the response can be an acknowledgement such as an 802.11 acknowledgement in response to PPDUs sent at S302. Based on the acknowledgement received and the data collected, access point 202 can determine a burst size for the corresponding endpoint device. The data collected can be a range of capabilities of the mobile device including, but not limited to, a current physical rate of the mobile device and current network and environmental conditions of the mobile device. In one example, one sounding probe is sent at S302, and it is enough to collect accurate data at S304.

At S306, access point 202 determines a burst size for active monitoring of each corresponding endpoint device subject to a constraint that the burst size would be small enough to not adversely affect the quality of user experience, but would be large enough to achieve a precise estimation of the throughput of the mobile device. For example, the burst size can be set to utilize less than a threshold (e.g., 5% or any other threshold determined based on experiments and/or empirical studies) of the approximate range of bandwidth of the mobile device.

In one example and using the collected data at S304, access point 202 determines the burst size based on the maximum transmission duration of an aggregated frame, the physical rate of the mobile device, and the size of a probe sent at S302. For example, maximum transmission duration of an aggregated frame (e.g. PPDU) can be 2 ms. Based on these data, the maximum number of probes per aggregated frame (e.g. PPDU) can be computed, and the burst size can be determined as twice the maximum number of probes per aggregated frame. This is to ensure that at least two aggregated frames are being sent for active monitoring. For another example, if the mobile device is an Institute of Electrical and Electronics Engineers (IEEE) 802.11b or 802.11n device with bad signal, its physical data rate will be below 10 Mb/s. Multiplying 10 Mb/s by the 2 ms duration of a PPDU results in 20000 bits per PPDU, which when divided by a 1500 byte size MSDU (with 8 bits equal to a byte), results in requiring two MSDUs for sending two PPDUs, hence a burst size of 2 (20000/(1500*8)≈1.67). Based on this situation, at S306 it can be determined that data packets cannot be aggregated so one data packet will be sent in a first frame, another data packet in a second frame. In contrast, if an 802.11ac client with 2*2 MIMO uses a physical rate of 866 Mb/s, the burst size would be 292. Similar to the calculation above for a burst size of 2 and assuming an MSDU size of 1480 bytes, (2*866 Mb/s*2 ms)/(1480*8)≈292, hence the burst size of 292. However, in some examples, because some versions of the mobile device limit the size of PPDU to 128 MSDUs, the burst size will be determined as the maximum burst size 256 instead of 292.

With a sounding phase and the subsequent burst size being determined per FIG. 3, FIG. 4 now describes an estimation phase for estimating (determining) the throughput of a given endpoint device to be used for labeling training data.

FIG. 4 illustrates an example method for determining the throughput of endpoint devices by active monitoring, according to an aspect of the present disclosure. The process 400 of FIG. 4 will be described from perspective of access point 202 of FIG. 2 but it should be understood that access point 202 has one or more processors configured to execute computer-readable instructions stored on one or more memories of access point 202 to implement the steps of FIG. 4.

At S402, access point 202 sends one or more bursts of packets to each endpoint device (e.g., 20 bursts). Size of each burst corresponds to the determined burst size determined at S306 of method 300 of FIG. 3. In one example, each burst can include at least a first number of probes and a second number of probes. The first number of probes may be aggregated into a first aggregated frame, the second number of probes are being aggregated into a second aggregated frame, with first and second aggregated frames being PPDUs described above. Each probe of the first number of probes and the second number of probes includes at least one data packet. In one example, first aggregated frame is sent to the endpoint device at a first time, and the second aggregated frame is sent at a second time after the first time. Sending two PPDUs each with at least one data packet allows for an estimation of an instantaneous throughput at each corresponding endpoint device. By sending multiple bursts (e.g., 20) and averaging all resulting instantaneous bursts, a throughput of each corresponding endpoint device can be estimated.

The aggregation may be based on frame aggregation technique used with newer Wi-Fi standards (IEEE 802.11n, 802.11ac, 802.11ax, etc.). To account for frame aggregation, a sufficiently high number of packets (e.g., MAC-level protocol data units (MSDUs)) can be provided together so that the packets are sent as an aggregated frame (e.g., PPDU).

In one example, the sum of the first number of probes and the second number of probes is based on the determined burst size for the specific mobile device, so sending the burst would not impact the quality of user experience as described above. Specifically, the sum of the first number and the second number may be smaller than or equal to the determined burst size based on method 300 for the corresponding endpoint device. For example, each of the first number of probes and the second number of probes may be smaller than 128 MSDUs, which is the limitation of some currently available frame aggregation techniques. However, the present disclosure is not limited to the limitation of 128 MSDUs and such limitation may be lower or higher.

By determining a customized burst size for each specific endpoint device based on method 300 of FIG. 3, the active probing technique can be tailored towards each specific endpoint device by sending the determined amount of probes based on the capabilities of the specific mobile device and the current network conditions of the specific mobile device, which addresses the deficiencies mentioned above with existing passive probing methods that do not account for continuously changing temporal and spatial wireless conditions. Furthermore, by determining a customized burst size for each connected endpoint device, access point 202 prevents sending too few packets that can result in an imprecise throughput being eventually determined, or sending too many packets which would incur a significant impact on the network connection of each corresponding endpoint device.

At S404, access point 202 receives an acknowledgement of receipt of each of the first number of probes and the second number of probes at S402. In one example, the receipt acknowledging the first number of probes may be received at a third time and an acknowledgement of receipt of the second number of probes may be received at a fourth time. The fourth time may be different or the same as the third time while both the third time and the fourth time are different than the first time and the second time at which the first number of probes and the second number of probes are sent to the corresponding endpoint device at S402. In one example, the third time (receipt of acknowledgement of the first number of probes) may be before the second time at which the second number of probes are sent at S402. In another example, the third time and the fourth time are both after the second time (that is the acknowledgement are received at the access point 202 after both the first number of probes and the second number of probes are sent at S402). In other words, S402 and S404 may be implemented interchangeably and/or simultaneously depending on when the first number of packets and the second number of packets are sent and corresponding acknowledgements are received.

In one example, such acknowledgements can be included in a packet completion event or a notification of a packet completion event sent from the corresponding endpoint device to the access point 202. Such packet completion events can be used to indicate the successful reception of each of the first number of probes and the second number of probes at the corresponding endpoint device 210, 212 and/or 214.

At S406, access point 202 determines a throughput for each corresponding endpoint device based on the difference between the third time and the fourth time at which different acknowledgements for the first number of probes and the second number of probes are received. As each of the first number of probes and the second number of probes is an aggregated frame, the difference between the third time and the fourth time is the time elapsed/delayed between the successful receptions of each aggregated frame within a given burst. Because network throughput (the actual rate of successful message delivery over a communication channel) is usually measured in bits per second, or in data packets per second, such a time difference and the size of each of the aggregated frames (the first and second numbers) within the burst can be used to estimate a real time throughput of the mobile device.

For example, the estimation of throughput for a particular endpoint device can be a result of total number of bytes in one aggregated frame divided by the time difference. The total number of bytes in one aggregated frame can be a sum of the packet lengths of all data packets in this aggregated frame. The time difference is between the acknowledgement of receipt of each of the first aggregated frame and the second aggregated frame (difference between the third time and fourth time). Before the final throughput is estimated, the time duration between sending of the first aggregated frame and the second aggregated frame is also taken into consideration to account for the mobile device transmission environment. For example, the time duration being longer than expected (e.g., a configurable threshold determined based on experiments and/or empirical studies), may be an indication that there is additional traffic from this mobile device or another mobile device, which is in turn an indication that the estimated throughput should be lowered for this particular endpoint device.

In one example, such determination of the throughput can be done at a different network component other than the access point 202 (e.g., in the cloud at a server of the network in which the access point 202 and connected endpoint devices are operating, etc.).

In one example, a bandwidth (the theoretical maximum data transfer rate of a communication channel) of the corresponding endpoint device can also be estimated based on the process of S406 described above.

The throughput estimation method of FIG. 4 may be affected by interference in an enterprise network. For example, the counting of the number of probes in an aggregated frame or a burst may not account for a longer back-off and a higher number of collisions due to the interference. In order to account for this interference, in one example, S402, S404 and S406 may be repeated several times in order to find at least two successfully transmitted aggregated frames and determines the duration between two successfully transmitted aggregated frames.

Therefore, at S408, the access point 202 determines whether the throughput determination process is to be repeated based on, for example, known interference in the network, detection of a triggering condition (described below), etc. If the access point 202 determines that the throughput determination process is to be repeated, then S402, S404 and S406 are repeated as shown in process 400 of FIG. 4.

As part of repeating S402, S404 and S406, multiple bursts (e.g., more than one) may be sent to each corresponding endpoint device at S402 in order to minimize the noise during the transmission of the bursts of aggregated packets. Moreover, the final real time throughput can be calculate based on an average of multiple time differences calculated at process S406 based on the sending of multiple bursts. Accordingly, the process of S402, S404 and S406 may be repeated several times as indicated in FIG. 4. For example, depending on the capabilities and network conditions of the mobile device, each iteration of S402, S404 and S406 can be completed within about 100 milliseconds to about 350 milliseconds. Thus, sending multiple bursts can be completed within a short period of time to still achieve a "real time" estimation of the throughput, as intended.

In one example, S402, S404 and S406 may be repeated periodically over a set period of time (determined based on experiments and/or empirical studies). For example, the set period of time can be a few minutes to a few days. In one example, processes S402, S404 and S406 are repeated after one or more changes to the condition of the mobile device or its network connection are detected (e.g., a triggering condition is detected). For example, the system operator can specify a triggering condition that activates the process of FIG. 4, examples of which include, but are not limited to, a change of location of a given endpoint device, an updated configuration, software or hardware changes completed on the endpoint device, etc. By repeating S402, S404 and S406, the present disclosure enables collection of more throughput data under difference circumstances for training the machine learning algorithm.

Referring back to S408, if the access point 202 determines that the throughput determination process is not to be repeated, then process 400 proceeds to S410 as described below.

As noted earlier above, the determined throughput of each endpoint device determined based on the active probing process of FIG. 4, can be used to automatically label data/metric of the corresponding endpoint device for training the underlying ML algorithm. Such metrics to be labeled include, but are not limited to, physical rate (e.g., capacity), the number of retried packets, the number of management frames, authentication failures, and the number of dynamic frequency selection (DFS) events.

Therefore, at S410, access point 202 labels data/metric of each endpoint device with a corresponding throughput determined at S410. The labeled data can then be used to train the underlying ML learning algorithm for determining the health of endpoint devices in a network, as described above. For example, a determined throughput for a given endpoint device may be determined to be greater than a given threshold (determined based on experiments and/or empirical studies). Therefore, specific metrics collected for the given endpoint device at the determined throughput (per FIG. 4) may be labeled as being indicative of the endpoint device being healthy. This labeled data is then used for training the ML technique such that once trained, the ML technique, upon detecting the same set of metrics can automatically determine the corresponding device as being healthy.

The processes of FIGS. 3 and 4 do not require user input on the endpoint device side and/or on the network side, nor do they require downloading and utilizing an application on the corresponding endpoint device. Accordingly, those of skill in the art would appreciate that the processes of FIGS. 3 and 4 can take place seamlessly without them being noticed by the corresponding user of each endpoint device resulting in the throughput data can be collected without impacting the quality of user experience.

With the automatic labeling process using active probing being described with reference to FIG. 4, the disclosure now turns to FIGS. 5 and 6, which illustrate example network devices and computing devices, such as switches, routers, load balancers, endpoint devices, and so forth.

FIG. 5 illustrates an example of a network device (e.g., switch, router, network appliance, etc.), according to one aspect of the present disclosure. The network device 500 can include a master central processing unit (CPU) 502, interfaces 504, and a bus 506 (e.g., a PCI bus). When acting under the control of appropriate software or firmware, the CPU 502 can be responsible for executing packet management, error detection, and/or routing functions. The CPU 502 preferably accomplishes all these functions under the control of software including an operating system and any appropriate applications software. The CPU 502 may include one or more processors 508 such as a processor from the Motorola family of microprocessors or the MIPS family of microprocessors. In an alternative embodiment, the processor 508 can be specially designed hardware for controlling the operations of the network device 500. In an embodiment, a memory 510 (such as non-volatile RAM and/or ROM) can also form part of the CPU 502. However, there are many different ways in which memory could be coupled to the system.

The interfaces 504 can be provided as interface cards (sometimes referred to as line cards). The interfaces 504 can control the sending and receiving of data packets over the network and sometimes support other peripherals used with the network device 500. Among the interfaces that may be provided are Ethernet interfaces, frame relay interfaces, cable interfaces, DSL interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 504 may include ports appropriate for communication with the appropriate media. In some cases, the interfaces 504 may also include an independent processor and, in some instances, volatile RAM. The independent processors may control communication intensive tasks such as packet switching, media control, and management. By providing separate processors for the communication intensive tasks, the interfaces 504 may allow the CPU 502 to efficiently perform routing computations, network diagnostics, security functions, and so forth.

Although the system shown in FIG. 5 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 500.

Regardless of the network device's configuration, it may employ one or more memories or memory modules (including the memory 510) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

FIG. 6 illustrates an example of a bus computing system, according to one aspect of the present disclosure. The components of the system 600 are in electrical communication with each other using a bus 605. The computing system 600 can include a processing unit (CPU or processor) 610 and a system bus 605 that may couple various system components including the system memory 615, such as read only memory (ROM) 620 and random access memory (RAM) 625, to the processor 610. The computing system 600 can include a cache 612 of high-speed memory connected directly with, in close proximity to, or integrated as part of the processor 610. The computing system 600 can copy data from the memory 615, ROM 620, RAM 625, and/or storage device 630 to the cache 612 for quick access by the processor 610. In this way, the cache 612 can provide a performance boost that avoids processor delays while waiting for data. These and other modules can control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in the storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing system 600, an input device 645 can represent any number of input mechanisms, such as a microphone for speech, a touch-protected screen for gesture or graphical input, keyboard, mouse, motion input, speech and so forth. An output device

635 can also be one or more of a number of output mechanisms known to those of skill in the art. In some instances, multimodal systems can enable a user to provide multiple types of input to communicate with the computing system 600. The communications interface 640 can govern and manage the user input and system output. There may be no restriction on operating on any particular hardware arrangement and therefore the basic features here may easily be substituted for improved hardware or firmware arrangements as they are developed.

The storage device 630 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 630 can include the software modules 632, 634, 636 for controlling the processor 610. Other hardware or software modules are contemplated. The storage device 630 can be connected to the system bus 605. In some embodiments, a hardware module that performs a particular function can include a software component stored in a computer-readable medium in connection with the necessary hardware components, such as the processor 610, bus 605, output device 635, and so forth, to carry out the function. For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
sending, by an access point, at least one probe to a mobile device;
determining based on the at least one probe an estimated physical rate associated with the mobile device;
is determining, using the estimated physical rate, a number of MAC Service Protocol Data Units (MSDUs) that fit within a single PLCP Protocol Data Unit (PPDU);
determining a burst size for at least one burst, the burst size being a number of probes for sending at least two PPDUs to the mobile device;
sending, by the access point, the at least one burst to the mobile device, wherein the at least one burst includes a first number of probes via a first PPDU and a second number of probes via a second PPDU, wherein the first number of probes are sent to the mobile device at a first time and the second number of probes are sent to the mobile device at a second time after the first time, and wherein the first number of probes and the second number of probes are based on the burst size;
receiving, from the mobile device, an acknowledgement of receipt of the first number of probes at a third time;
receiving, from the mobile device, an acknowledgement of receipt of the second number of probes at a fourth time;
determining, based on a difference between the third time and the fourth time, a throughput of the mobile device;
comparing the throughput with a threshold;
labeling a set of data associated with the throughput as indicative of whether the mobile device is healthy based on comparing the throughput to the threshold, to yield labeled set of data; and
training a machine learning algorithm using the labeled set of data for predicting a wireless connection quality of the mobile device.

2. The method of claim 1, wherein the set of data comprises at least one of a signal strength, an interference level, a latency, a physical data-rate, or a packet loss rate.

3. The method of claim 1, wherein the at least one probe comprises at least one data packet, and wherein each of the first number of probes and the second number of probes comprises at least one data packet.

4. The method of claim 1, wherein the at least one probe is sent to the mobile device at a current data rate of the mobile device.

5. The method of claim 1, wherein detecting at least one change in a network condition of the mobile device triggers the determining of the throughput.

6. An access point comprising:
one or more processors; and
at least one computer-readable storage medium having stored therein instructions which, when executed by the one or more processors, cause the one or more processors to:
send at least one probe to a mobile device;
determine based on the at least one probe an estimated physical rate associated with the mobile device;
determine, using the estimated physical rate, a number of MAC Service Protocol Data Units (MSDUs) that fit within a single PLCP Protocol Data Unit (PPDU);
determine a burst size for at least one burst, the burst size being a number of a number of probes for sending at least two PPDUs to the mobile device;
send, by the access point, the at least one burst to the mobile device, wherein the at least one burst includes a first number of probes via a first PPDU and a second number of probes via a second PPDU, wherein the first number of probes are sent to the mobile device at a first time and the second number of probes are sent to the mobile device at a second time after the first time, and wherein the first number of probes and the second number of probes are based on the burst size;
receive, from the mobile device, an acknowledgement of receipt of the first number of probes at a third time;
receive, from the mobile device, an acknowledgement of receipt of the second number of probes at a fourth time;
determine, based on a difference between the third time and the fourth time, a throughput of the mobile device;
compare the throughput with a threshold;
label a set of data associated with the throughput as indicative of whether the mobile device is healthy based on comparing the throughput to the threshold, to yield labeled set of data; and
train a machine learning algorithm using the labeled set of data for predicting a wireless connection quality of the mobile device.

7. The access point of claim 6, wherein the set of data comprises at least one of a signal strength, an interference level, a latency, a physical data-rate or a packet loss rate.

8. The access point of claim 6, wherein the at least one probe comprises at least one data packet, and wherein each of the first number probes and the second number of probes comprises at least one data packet.

9. The access point of claim 6, wherein the at least one probe is sent to the mobile device at a current data rate of the mobile device.

10. The access point of claim 6, wherein the instructions which, when executed by the one or more processors, further cause the one or more processors to detect at least one change in a network condition of the mobile device that triggers the determining of the throughput.

11. A non-transitory computer-readable storage medium comprising instructions which, when executed by one or more processors of an access point, cause the access point to:
send at least one probe to a mobile device;
determine based on the at least one probe an estimated physical rate associated with the mobile device;
determine, using the estimated physical rate, a number of MAC Service Protocol Data Units (MSDUs) that fit within a single PLCP Protocol Data Unit (PPDU);
determine a burst size for at least one burst, the burst size being a number of a number of probes for sending at least two PPDUs to the mobile device;
send, by the access point, the at least one burst to the mobile device, wherein the at least one burst includes a first number of probes via a first PPDU and a second number of probes via a second PPDU, wherein the first number of probes are sent to the mobile device at a first time and the second number of probes are sent to the mobile device at a second time after the first time, and wherein the first number of probes and the second number of probes are based on the burst size;
receive, from the mobile device, an acknowledgement of receipt of the first number of probes at a third time;
receive, from the mobile device, an acknowledgement of receipt of the second number of probes at a fourth time;
determine, based on a difference between the third time and the fourth time, a throughput of the mobile device;
compare the throughput with a threshold;
label a set of data associated with the throughput as indicative of whether the mobile device is healthy based on comparing the throughput to the threshold, to yield labeled set of data; and
train a machine learning algorithm using the labeled set of data for predicting a wireless connection quality of the mobile device.

12. The non-transitory computer-readable storage medium of claim 11, wherein the set of data comprises at least one of a signal strength of the mobile device, an interference level of the mobile device, a latency, a physical data-rate or a packet loss rate.

13. The non-transitory computer-readable storage medium of claim 11, wherein the at least one probe is sent to the mobile device at a current data rate of the mobile device.

14. The non-transitory computer-readable storage medium of claim 11, wherein execution of the instructions by the one or more processors further cause the access point to detect at least one change in a network condition of the mobile device that triggers the determining of the throughput.

* * * * *